Oct. 13, 1959  O. W. STEPHENSON  2,908,483
ADJUSTABLE CORE EXTRACTOR
Filed Dec. 19, 1957
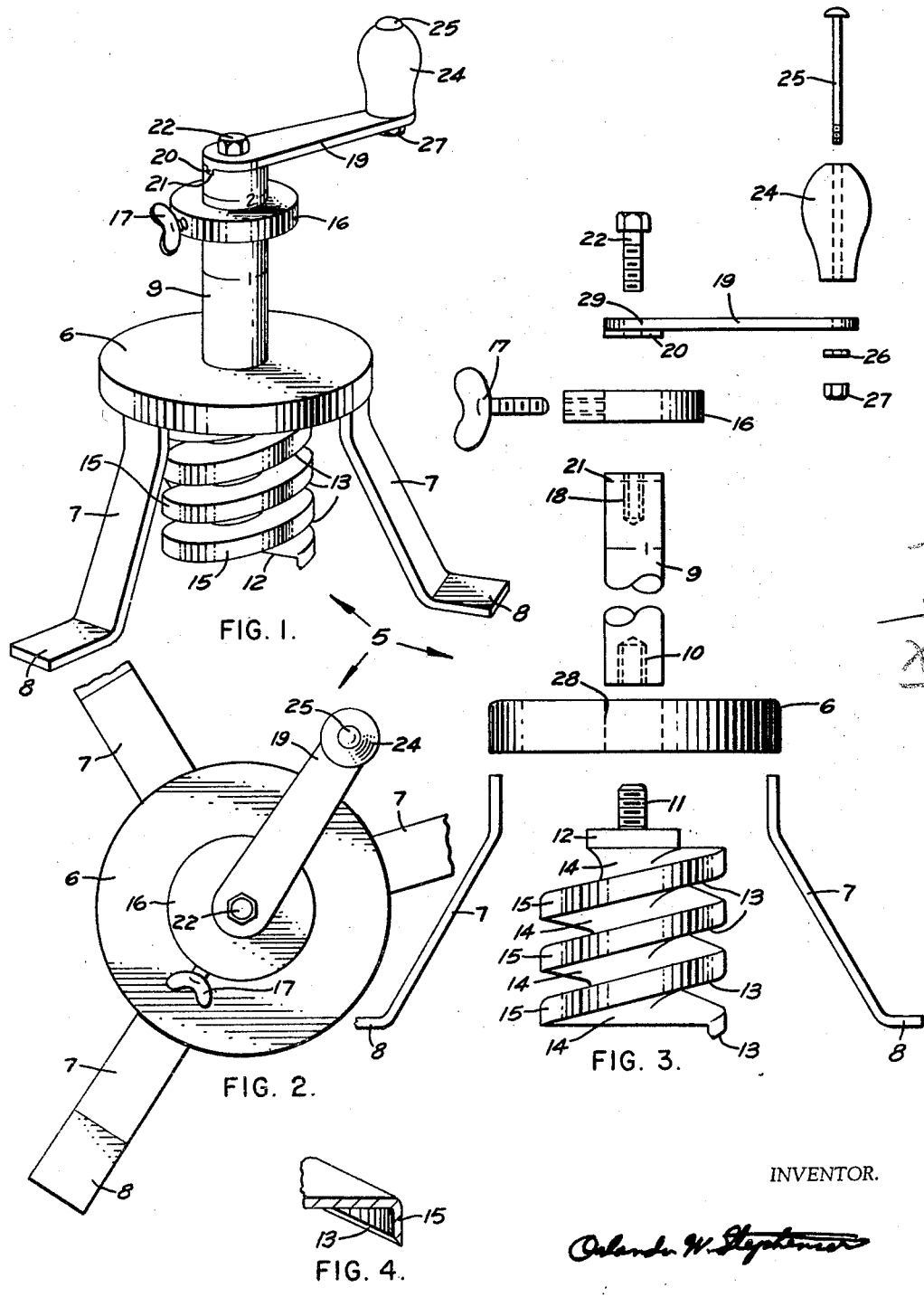
INVENTOR.
Orlando W. Stephenson United States Patent Office 2,908,483
Patented Oct. 13, 1959

2,908,483

ADJUSTABLE CORE EXTRACTOR

Orlando W. Stephenson, New Orleans, La., assignor to Gadget-Of-The-Month Club, Inc., Los Angeles, Calif., a corporation of California Application December 19, 1957, Serial No. 703,938

2 Claims. (Cl. 255—69)

Generally speaking, the present invention relates to the garden implement art and, more specifically, relates to an improved adjustable core extractor whereby the ground may be prepared for the planting of small trees, bulbs or the like.

An object of the present invention is to provide an adjustable core extractor which may be easily and quickly set up for use in the garden.

Another object of the present invention is to provide an adjustable core extractor including an annular drill having a spiral holding rim which facilitates the extraction of dirt cores from the garden.

It is a further object of the present invention to provide a device of the character set forth in the preceding objects, which is inexpensive, simple, easy to operate and of virtually foolproof construction.

Other and allied objects will be apparent to those skilled in the art after a careful perusal, examination and study of the accompanying illustrations, the present specification, and the appended claims.

To facilitate understanding, reference will be made to the hereinbelow described figures, in which:

Fig. 1 is a perspective view of the present invention;

Fig. 2 is a top plan view of the present invention;

Fig. 3 is an exploded front elevational view of the present invention; and

Fig. 4 is a fragmentary perspective view of the holding rim and cutting edge.

Generally speaking, the adjustable core extractor, indicated generally at 5 in Figs. 1–3, is provided with a stand, whereby the extractor 5 may be firmly supported during the extraction process. The stand, in the particular example illustrated in Figs. 1–3, is provided with an elevated horizontal base support member 6 which has three symmetrically spaced legs 7 depending from the base member 6. The legs 7 are affixed to the base support member 6 by welding, although mechanical fastening means may be used in lieu thereof. Integral horizontally directed base portions 8 on the legs 7 provide steady support when positioned on the ground.

The base support member 6 is provided with a central aperture 28 therethrough, as illustrated in phantom in Fig. 3, wherein an extension member 9 is journalled. The extension member 9 is provided with an interiorly threaded portion 10 in the lower end thereof, as best shown in Fig. 3, which is threadingly engaged with the reduced threaded stem 11 of the drill 12.

The annular drill 12 has a continuous spiral cutting edge 13, a continuous spiral recessed portion 14, and a continuous spiral holding rim 15, as shown in Figs. 1 and 3. As the drill 12 is rotated the cutting edge 13 cuts into the ground, thereby causing the dirt to become lodged into the recessed portion 14 and with the holding rim 15, as best shown in Fig. 4, facilitating the packing of the dirt around the recessed portion 14 and preventing pieces of earth from breaking away, whereby a core of earth may be removed for subsequent planting of bulbs or the like.

The extension member 9 is graduated in terms of inches and is cooperable with the adjustable collar 16 to selectively adjust the drill depth, as best illustrated in Figs. 1 and 3. A wing nut 17 is threadingly engaged with the interiorly threaded portion 18, whereby the wing nut 17 may frictionally engage the extension member 9 to removably lock the collar 16 in place. As the lower surface of the collar 16 comes into contact with the upper surface of the base support member 6 it will effectively stop the drilling at the desired depth.

A crank 19 is removably attached with respect to the extension member 9, whereby the drill 12 may be easily rotated. A key 20 on the crank 19 is positioned within the keyway 21 on the top of the extension member 9, as illustrated in Figs. 1 and 3. The crank 19 is secured to the extension member 9 by means of the threaded bolt 22 which is inserted through the aperture 29 and threadingly engages the upper interiorly threaded portion 23 on the extension member 9.

A vertical hand-grip 24 is removably secured to the crank 19 by means of the bolt 25, washer 26, and nut 27. The hand-grip 24 may be made integral with the crank 19 in some versions of the present invention.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the extension member and the drill of the present invention may be made integral in some versions; however, the preferred version is with the extension member in order that a variety of drill sizes may be used conveniently and economically with the device. Also the crank means and the support stand may be modified substantially.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplarly only, and is not intended to limit the scope of the present invention, which is to be interpreted in the light of the prior art and the appended claims only, with due consideration for the doctrine of equivalents.

I claim:

1. A garden core extractor, comprising: a stand including an elevated base support member having an aperture therethrough and leg means depending from said base support member; a spiral drill having a vertical center portion, a continuous flat spiral portion extending spirally outwardly from said vertical center portion, a vertically downwardly directed continuous spiral holding rim at the outer periphery of said continuous flat spiral portion and provided with a vertically downwardly directed continuous spiral cutting edge, said vertically downwardly directed continuous spiral holding rim and the adjacent outer periphery of said continuous flat spiral portion to which it is attached, being substantially mutually perpendicular and defining therebetween a continuous spiral recessed portion immediately beneath the outer periphery of said continuous flat spiral portion and immediately inside of said vertically downwardly directed continuous spiral holding rim; a graduated extension member cooperable for removable attachment with respect to said drill; said extension member being journalled within said aperture of said base support member; adjustable stop means on said extension member cooperable for selectively adjusting the drill depth; manually operable actuating means, attached with respect to said extension member, cooperable for rotating said drill.

2. An adjustable portable garden core extractor, comprising: a stand including an elevated horizontal base support member having an aperture therethrough and leg means depending from said base support member; a spiral drill having a vertical center portion, a continuous flat spiral portion extending spirally outwardly from said vertical center portion, a vertically downwardly directed continuous spiral holding rim at the outer periphery of said continuous flat spiral portion and provided with a vertically downwardly directed continuous spiral cutting edge, said vertically downwardly directed continuous spiral holding rim and the adjacent outer periphery of said continuous flat spiral portion to which it is attached, being substantially mutually perpendicular and defining therebetween a continuous spiral recessed portion immediately beneath the outer periphery of said continuous flat spiral portion and immediately inside of said vertically downwardly directed continuous spiral holding rim; a reduced threaded stem on the attachment end of said drill; a graduated extension member having an interiorly threaded portion in the lower end thereof which is cooperable for threaded engagement with said reduced threaded stem of said drill; said extension member being vertically journalled within said aperture of said base support member; adjustable collar means on said extension member cooperable for selectively adjusting the drill depth; removable manually operable actuating means, attached with respect to the upper end of said extension member, cooperable for rotating said drill.

References Cited in the file of this patent

UNITED STATES PATENTS

| | | |
|---|---|---|
| 183,467 | Pierce | Oct. 17, 1876 |
| 542,584 | Carter | July 9, 1895 |
| 1,910,143 | Arenz | May 23, 1933 |